United States Patent [19]

Rahman et al.

[11] 4,104,414

[45] Aug. 1, 1978

[54] PROCESS OF MAKING DEHYDRATED FRUIT JUICE

[75] Inventors: Abdul R. Rahman; Wayne A. Deneke, both of Natick, Mass.

[73] Assignee: The United States of America as represented by the Secretary of the Army, Washington, D.C.

[21] Appl. No.: 481,926

[22] Filed: Jun. 21, 1974

Related U.S. Application Data

[63] Continuation of Ser. No. 269,630, Jul. 7, 1972.

[51] Int. Cl.² .................................................. A23L 2/06
[52] U.S. Cl. .................................... 426/599; 426/385; 426/489
[58] Field of Search ............... 426/342, 365, 366, 369, 426/378, 380, 384, 385, 404, 471, 472, 473, 489, 490, 495, 268, 270, 590, 616, 640, 599, 518

[56] References Cited

U.S. PATENT DOCUMENTS

| 2,471,678 | 5/1949 | Flosdorf | 426/268 |
| 3,023,111 | 2/1962 | Huber | 426/384 |
| 3,298,838 | 1/1967 | Villarreal | 426/270 |
| 3,379,538 | 4/1968 | Berry | 426/404 |
| 3,385,711 | 5/1968 | Sperti | 426/495 |

Primary Examiner—Hiram H. Bernstein
Attorney, Agent, or Firm—Nathan Edelberg; Robert P. Gibson; Charles C. Rainey

[57] ABSTRACT

Process of making an instantly rehydratable, non-caking, storage-stable, dehydrated fruit juice product, especially orange juice, grapefruit juice, and pineapple juice, by removing a substantial portion of the supernatant liquid portion of the fruit juice separated from the sediment portion by centrifuging of the fruit juice, then dehydrating the sediment portion either alone or with a small portion of the supernatant liquid portion remaining with the sediment portion. Citric acid and sucrose may be added to the dehydrated sediment portion prior to hermetic packaging or at time of rehydration.

2 Claims, No Drawings

PROCESS OF MAKING DEHYDRATED FRUIT JUICE

The invention described herein may be manufactured, used, and licensed by or for the Government for governmental purposes without the payment to us of any royalty thereon.

This is a continuation of application Ser. No. 269,630, filed Jul. 7, 1972.

This invention relates to a method of producing a dehydrated fruit juice product which is readily rehydratable, is storage stable and does not cake during storage at elevated temperatures.

Dehydrated fruit juices in powder form, particularly dehydrated orange juice, dehydrated grapefruit juice, and dehydrated pineapple juice, are very desirable components of field rations for the Armed Forces and of space rations for astronauts. However, there has been a tendency of such dehydrated fruit juices to lump and cake, particularly as a result of storage at temperatures such as 100° F. or higher when packaged in flexible containers under vacuum. This has militated against the incorporation of such dehydrated fruit juices in field and space rations. In both military and space operations such temperatures are frequently encountered, resulting in great difficulty in rehydrating the dehydrated fruit juices if they have become caked. Hence, any component of food ration must be stable under such high temperature conditions in order to merit serious consideration as a part of field or space rations.

It is an object of the present invention to provide a method of making a dehydrated fruit juice product which will overcome the above-discussed deficiency in prior dehydrated fruit juice products.

It is another object of the present invention to provide improved dehydrated fruit juice products which will be storage-stable without caking or lump formation at elevated temperatures and will be instantly rehydratable to a fruit juice having the appearance, flavor and consistency of freshly prepared fruit juice of the same type.

Other objects and advantages will appear from the following description of the invention, and the novel features will be particularly pointed out in connection with the appended claims.

The dehydrated fruit juice product of the present invention is made resistant to caking by centrifuging the freshly prepared (or frozen and thereafter thawed) fruit juice, then removing part of the supernatant portion of the centrifuged fruit juice prior to dehydration of the sediment portion alone or together with a portion of the supernatant liquid. The sediment portion is then dehydrated and the supernatant liquid portion may also be dehydrated and a portion of the latter dehydrated product may be mixed with the dehydrated sediment portion after each has been comminuted to granules of a suitable size. Any loss in flavor and sweetness resulting from the removal of part of the supernatant portion of the fruit juice may be overcome by adding citric acid and a non-reducing sugar, such as sucrose, to the dehydrated fruit juice product at the time of packaging or at the time of rehydration of the dehydrated fruit juice or at any other suitable time.

We have found that not less than about eighty percent by weight of the supernatant portion of the fruit juice should be removed prior to dehydration of the sediment portion or the sediment portion plus up to twenty percent by weight of the supernatant portion in order to avoid caking of the final product when stored at temperatures of 100° F. or higher, especially when the final product is packaged in flexible containers under vacuum. We prefer to remove about 80 percent of the supernatant portion of the centrifuged fruit juice by weight. The sediment portion plus the remainder of the supernatant portion will thus retain a substantial amount of the normally present flavoring ingredients while being free of the tendency to cake or lump at temperatures of 100° F. or higher when dehydrated and packaged at such high temperatures for an appreciable length of time.

As has been pointed out above, removal of a substantial part of the supernatant portion of the fruit juice prior to dehydration results in a dehydrated fruit juice product of somewhat reduced flavor and sweetness. To compensate for this, we add enough citric acid or other fruit flavor agents or artificial flavoring agents, and enough granulated or powdered sucrose or other non-reducing sugar to the dehydrated fruit juice product to make the dehydrated product taste substantially like the fresh fruit juice or at least to give it a flavor and sweetness which will make it acceptable and quite similar in flavor, sweetness and consistency to fresh fruit juice when rehydrated. The proportion of citric acid or other flavoring ingredient added and also the proportion of sucrose or other non-reducing type sugar added will depend to a considerable degree on the type of fruit juice being used, the conditions under which the fruit was grown, the degree of maturity of the fruit at the time of processing and the flavor preference of the consumers. In general, we add from about 9.0 to about 11.0 percent citric acid and from about 100.0 to about 250.0 percent of sucrose or other non-reducing sugar, these proportions being based on the weight of the dehydrated fruit juice product. It is our practice to add these ingredients to the package at the time of hermetic packaging of the dehydrated fruit juice product, but they may be added during rehydration of the fruit juice or at other suitable times following dehydration of the centrifuged fruit juice, or, if desirable, they may be omitted, or only one of them may be added. These ingredients do not require thorough mixing with the dehydrated fruit juice product at the time of packaging since they will normally be stirred into the rehydrated fruit juice during reconstitution thereof immediately prior to consumption of the reconstituted fruit juice.

In the centrifuging of the fruit juice, in general a speed of at least about 1500 r.p.m. will usually be required to effect separation of the fruit juice into a sediment portion and a supernatant portion, which makes possible the carrying out of the essential aspect of the invention, namely removal of a substantial portion of the supernatant liquid portion from the sediment portion. The higher the speed, the more rapid the separation of the fruit juice into sediment and supernatant portions. When a speed of about 2000 to 3000 r.p.m. is employed, about 15 minutes are required to effect the separation with orange juice. At speeds appreciably above 3000 r.p.m. the time for separation may be reduced to as low as 3 or 4 minutes.

In general we have found it desirable to dehydrate the sediment portion as well as the supernatant portion that is added to the dehydrated sediment solid portion to a moisture content not over about three percent or to dehydrate the sediment portion and up to twenty percent of the supernatant portion to not over about three percent moisture, the moisture content being by weight wherever mentioned in the specification or claims. It is also desirable that the final dehydrated fruit juice product have a moisture content of not over about three percent. The dehydration may be carried out by any known procedure that has proven effective for fruit juices, such as freeze-vacuum-dehydration, foam-mat dehydration, spray drying, or any other dehydration process that does not produce marked flavor changes in the fruit juice constituents due to excessive heating, oxidation, or other adverse reactions.

In general it is desirable for the dehydrated sediment solid portion and the dehydrated supernatant solid portion to be ground or otherwise comminuted so that the granules formed thereby will pass through a sieve having openings from about 0.0787 inch (No. 10 sieve) to about 0.0064 inch (No. 60 sieve). Such granule sizes will in general rehydrate quite easily and quickly and will be less likely to cake or form lumps under even more strigent circumstances than 100° F. Of course, if it is to be expected that temperatures above 100° F. will be encountered while packages of the dehydrated fruit juice are in storage or in transit, the proportion of supernatant liquid removed from the sediment portion may be increased, and if necessary, all of it may be removed and only the dehydrated sediment solid portion used.

In the packaging of the dehydrated fruit juice product, it is desirable to employ a vacuum of from about twenty to about twenty-nine inches of mercury to minimize oxidation of the dehydrated fruit juice product during storage or transit. Other methods of protecting the dehydrated fruit juice product from oxidation, such as packaging under inert gases, may be employed if desired. The important consideration is that substantially all of the oxygen be removed from the dehydrated fruit juice granules and any added flavoring and sweetening agents prior to sealing the package and that the package be made of material which is impermeable to oxygen and be hermetically sealed after substantially all of the oxygen has been removed. The packaging material also should be highly resistant to the transposition of moisture therethrough so that the moisture content of the final dehydrated fruit juice product will remain substantially the same as when it was first packaged even after the passage of months or even years in storage under extremely moist and hot conditions, as will sometimes occur with military rations.

Having described the general conditions under which the invention may be practiced, we will now disclose an example of the production of a dehydrated orange juice product in granular form in accordance with this invention. It will be understood, of course, that the above-enumerated and other objects of our invention may also be accomplished by varying the fruit from which the juice is extracted for the process, the amount or proportions of the supernatant liquid removed from the sediment portion prior to dehydration, or the amount or proportion of the dehydrated supernatant solid portion added back to the dehydrated sediment solid portion prior to packaging thereof, the amount of or proportion of citric acid or other flavoring agent added in dry form to the dehydrated fruit juice solids prior to packaging or even after opening the package at some later time, the amount of or proportion of sucrose or other non-reducing sugar added in dry form to the dehydrated fruit juice solids prior to packaging or even after opening the package at some later time, and by other suitable variations of the detailed method steps, about to be set forth below, which are intended to be for illustrative purposes and not for the purpose of limiting the scope of our invention.

EXAMPLE

Whole fresh oranges were cut into halves and substantially all of the juice was removed therefrom by squeezing. The freshly prepared orange juice was centrifuged at about 2000 r.p.m. until a clear separation into a sediment portion and a supernatant liquid portion occurred. The supernatant liquid portion was decanted from the sediment portion. Approximately 20 percent of the supernatant liquid portion was remixed with the sediment portion and the mixture was freeze-vacuum-dehydrated in a conventional manner. (The same result in terms of orange juice solids may be attained by separately freeze-vacuum-dehydrating the sediment portion and the supernatant liquid portion and thereafter, after suitable grinding of both freeze-dried portions, adding approximately 20 percent of the freeze-dried supernatant solids in granular form to the freeze-dried sediment solids in granular form and thoroughly mixing the granules together in the dry state.) The freeze-vacuum-dehydrated sediment portion containing about 20 percent of the supernatant solids was ground in a mortar to a particle size that would pass through a No. 20 sieve (having 0.0335 inch openings). Five grams of this mixture of freeze-dried orange juice solids (or five grams of the mixture of freeze-dried orange juice solids prepared by the alternative procedure described above) were dissolved in 100 ml. of water together with 0.5 gm. of citric acid and 8.5 gms. of sucrose to produce a reconstituted orange juice of substantially equivalent strength to that of the fresh orange juice from which the dehydrated orange juice was prepared. A technological panel found that the reconstituted freeze-dried orange juice tasted equally as good as the fresh orange juice and had a consistency substantially equivalent to that of fresh orange juice.

Similar mixtures of five grams of the mixture of freeze-dried orange juice solids with 0.5 gm. of citric acid in dry powdery form and 8.5 gms. of granulated sucrose were packaged under a vacuum of 29 inches of mercury in flexible laminated film envelopes comprising a sandwich of polyethylene terephthalate ("Mylar") film on the outside, polyethylene film on the inside, and aluminum foil between the polyethylene terephthalate and the polyethylene films and hermetically sealed therein. The mixture had a moisture content of 2.0 percent.

Several of the packages of the mixture containing the added citric acid and sucrose were placed in an oven at 135° F. and permitted to remain there for 3 hours. Several others of the packages of the mixture containing the added citric acid and the sucrose were placed in an oven at 100° F. and permitted to remain there for 2 weeks. None of the packages of the dehydrated orange juice mix exposed to the elevated temperatures as described above showed any caking, and they were readily and instantly rehydratable; whereas dehydrated orange juice solids prepared in a conventional manner without the removal of the solids present in the supernatant portion of centrifuged orange juice, when similarly dehydrated and packaged and then exposed to elevated temperatures under the same conditions as described above, caked badly and could not be readily rehydrated. In fact, the latter samples could only be partially rehydrated after lengthy exposure to hot water or prolonged exposure to cold water after regrinding of the caked solids.

Although the invention has been described in connection with orange juice, grapefruit juice, and pineapple juice, it is to be understood that it is applicable to other fruit juices. At present there is relatively little interest in the preparation of other dehydrated fruit juices either for the civilian market or for the Armed Services or the National Aeronautics and Space Administration. However, interest may well develop in other dehydrated fruit juices, particularly now that a way has been found to permit longterm storage even at elevated temperatures without caking of the dehydrated fruit juice solids to such an extent as to render rehydration extremely difficult and time-consuming. For example, dehydrated grape juice or peach juice or apricot juice may well become commonplace supermarket and kitchen products, ready at a moment's notice to be instantly converted into very tasty fruit juices, yet storage-stable for years so long as the hermetically sealed packages remain intact, and having the additional advantage of requiring comparatively little storage space considering the amounts of fresh juice that would be equivalent in solids content.

The present invention solves a problem that has seriously hampered the development of dehydrated food rations for the Armed Services and for space explorations. Fruit juices have become an important constituent of most diets, orange juice being probably the most widely and frequently consumed fruit juice product. For years the big objective in ration development for the Armed Services and for space exploration has been to reduce to an absolute minimum the space, and insofar as possible the weight, of all or as many as possible of the well-accepted food items to which people are accustomed and which they will consume, preferably with as much pleasure as they would derive from eating the fresh, natural food product. The present invention moves the fruit juice category of foods developed for rations forward very significantly and may well have a far-reaching effect on the civilian market as well.

It will be understood, of course, that the foregoing example of the practice of our invention is for illustrative purposes and that the detailed instructions as to conditions, proportioning of ingredients, and sequence of steps in the process may be varied within the skill of the expert in the art of food technology. These and other variations which will readily occur to the expert are thus included within the spirit and scope of our invention and the subjoined claims.

We claim:

1. A process for producing a dehydrated orange juice powder which is storage-stable, non-caking when packaged under vacuum in flexible packages and stored at temperatures of 100° F. or higher, and instantly rehydratable after storage at said temperatures, which comprises the steps of extracting orange juice from oranges, said orange juice comprising liquid and pulp components, centrifuging said orange juice at about 2000 r.p.m. for a time sufficient for separation of said orange juice into a sediment portion and a supernatant liquid portion to occur, said sediment portion containing substantially all of said pulp components, removing a first fraction of said supernatant liquid portion while leaving the remaining fraction of said supernatant liquid portion with said sediment portion, remixing said sediment portion with said remaining fraction of said supernatant liquid portion, freeze-vacuum-dehydrating the resulting mixture of said sediment portion with said remaining fraction of said supernatant liquid portion to produce dehydrated orange juice solids having a moisture content of not more than about 2.0 percent by weight, and comminuting said dehydrated orange juice solids to form a dehydrated orange juice powder of particle size capable of passing through a sieve having about 0.0335 inch openings, said first fraction being not less than about eighty percent by weight of said supernatant liquid portion and said remaining fraction being up to twenty percent by weight of said supernatant liquid portion.

2. An instantly rehydratable, non-caking, storage-stable, dehydrated orange juice powder product made in accordance with the process of claim 1.

* * * * *